United States Patent [19]

Johnson et al.

[11] Patent Number: 4,885,563

[45] Date of Patent: Dec. 5, 1989

[54] POWER LINE CARRIER COMMUNICATION SYSTEM

[75] Inventors: Richard A. Johnson, Murrysville Boro; Arthur A. Anderson, Irwin; Dirk J. Boomgaard, Monroeville Borough, all of Pa.

[73] Assignee: Thermo King Corporation, Minneapolis, Minn.

[21] Appl. No.: 189,895

[22] Filed: May 3, 1988

[51] Int. Cl.⁴ .............................................. H04M 11/06
[52] U.S. Cl. ......................... 340/310 A; 340/310 CP; 340/538; 340/310 R
[58] Field of Search .......... 340/310 R, 310 A, 825.07, 340/538, 310 CP, 825.62; 307/103; 379/394; 370/31; 375/7

[56] References Cited

U.S. PATENT DOCUMENTS

| | | |
|---|---|---|
| 3,270,142 | 8/1966 | Wilson ................................. 379/394 |
| 3,708,630 | 1/1973 | Matsuda et al. ................. 379/394 X |
| 3,911,415 | 10/1975 | Whyte . |
| 3,942,168 | 3/1976 | Whyte . |
| 3,942,170 | 3/1976 | Whyte . |
| 3,967,264 | 6/1976 | Whyte et al. . |
| 3,980,954 | 9/1976 | Whyte . |
| 4,139,735 | 2/1979 | Dorfman et al. ............ 340/310 R X |
| 4,234,926 | 11/1980 | Wallace et al. ...................... 364/551 |
| 4,377,804 | 3/1983 | Suzuki ............................ 340/310 A |
| 4,402,191 | 9/1983 | King . |
| 4,409,797 | 10/1983 | King et al. . |
| 4,424,684 | 1/1984 | Waldschmidt et al. . |
| 4,429,299 | 1/1984 | Kabat et al. ...................... 340/310 R |
| 4,636,771 | 1/1987 | Ochs ............................. 340/310 CP |
| 4,697,166 | 9/1987 | Warnagiris et al. ............. 340/310 R |

Primary Examiner—Joseph A. Orsino
Assistant Examiner—Brian R. Tumm
Attorney, Agent, or Firm—D. R. Lackey

[57] ABSTRACT

A power line carrier communication system having a carrier current transceiver (CCT) interface with an electrical power line via a buffer which automatically provides a low output drive impedance while transmitting, and a high receiving impedance when receiving, all with solid state circuitry. The length of signal transmission by the CCT is monitored and automatically prevented from continuously loading the communication network in the event of a malfunction which causes a signal transmission to exceed normal maximum transmission time. Prevention of continuous loading of the communication circuit is accomplished without adverse affect on the CCT via a crowbar circuit connected to the buffer circuitry.

8 Claims, 2 Drawing Sheets

POWER LINE CARRIER COMMUNICATION SYSTEM

BACKGROUND OF THE INVENTION

1. Field of the Invention

The invention relates in general to a power line carrier communication system, and more specifically to apparatus for improving the reception and transmission of communication signals over an electrical distribution power line.

2. Description of the Prior Art

Electrical utilities have used their high voltage transmission lines for many years for communication with remote switching and substation sites, for supervisory control purposes. Transmission lines are ideal for communication as they extend from the power generation site to the remote sites without intervening obstacles. Use of the distribution power lines, however, has been slower to develop, as the distribution power lines are susceptible to electrical noise and interference, and they include distribution transformers, electrical loads, sectionalizing switches, capacitor banks, and the like, which attenuate communication frequencies. The increasing desirability of being able to selectively and remotely control electrical loads on the distribution system, and the availability of low cost encoders for automatic meter reading, have produced a flurry of activity in the use of distribution power lines for communication purposes. U.S. Pat. Nos. 3,911,415; 3,942,168; 3,942,170; 3,967,264; and 3,980,954, describe some of the early problems encountered, and solutions thereto, when using electrical distribution power lines for communication.

A specialized use of electrical distribution power lines for communication purposes has been disclosed in U.S. Pat. No. 4,234,926. Refrigerated containers, called "reefers" are monitored by a central computer, using the power lines for polling or interrogating remotely located computerized monitoring units associated with the reefers, as well as for receiving reefer status data in return. Since large numbers of reefers are stacked aboard ships, as well in ship terminals, the use of the electrical power lines connected to the reefers for the additional functions of monitoring and control substantially increases the speed and reliability of the monitoring process, which is normally manually performed.

While the use of ship and ship terminal electrical distribution lines for communication may seem simple and straight forward compared with the attenuating obstacles encountered by the electric utilities in using their distribution systems for communication, ship and ship terminal electrical systems can have substantial amounts of electrical noise. For example, large adjustable speed motor drives which chop the electrical waveform may be used, which feed large amounts of electrical noise back into the power lines.

SUMMARY OF THE INVENTION

Briefly, the present invention is a power line carrier communication system which includes power line coupling apparatus for improving the reception and transmission of power line carrier communication signals. The power line coupling apparatus includes a new and improved buffer or coupling interface disposed between a carrier current transceiver (CCT) and an electrical distribution power line. The CCT has an input/output (I/O) port for receiving serial signals (RX Signals) from a power line via the buffer, and for applying serial signals (TX Signals) to a power line via the buffer. The buffer includes impedance devices which provide a predetermined high receiving impedance when the CCT is in a receiving mode, and solid state switching devices responsive to TX Signals for automatically reconfiguring the buffer to provide a predetermined low output drive impedance when the CCT is in a transmitting mode.

The buffer further includes a timing circuit which times the duration of a transmission of TX Signals by the CCT, and a disable circuit which is actuated when the timing circuit detects an unduly long transmission, to prevent the TX Signals from being applied to the electrical power line. The timing and disable circuits are automatically reset by a reset circuit a predetermined period of time after the termination of a transmission which actuated the disable means.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Concurrently filed application Ser. No. 189,566 entitled "Power Line Carrier Communication System For Monitoring Refrigerated Containers" which is assigned to the same assignee as the present application, discloses new and improved communication message protocols which improve the reliability of power line communication over ship, and ship terminal electrical distribution power lines. This co-pending application is hereby incorporated into the specification of the present application by reference.

Figure 1:
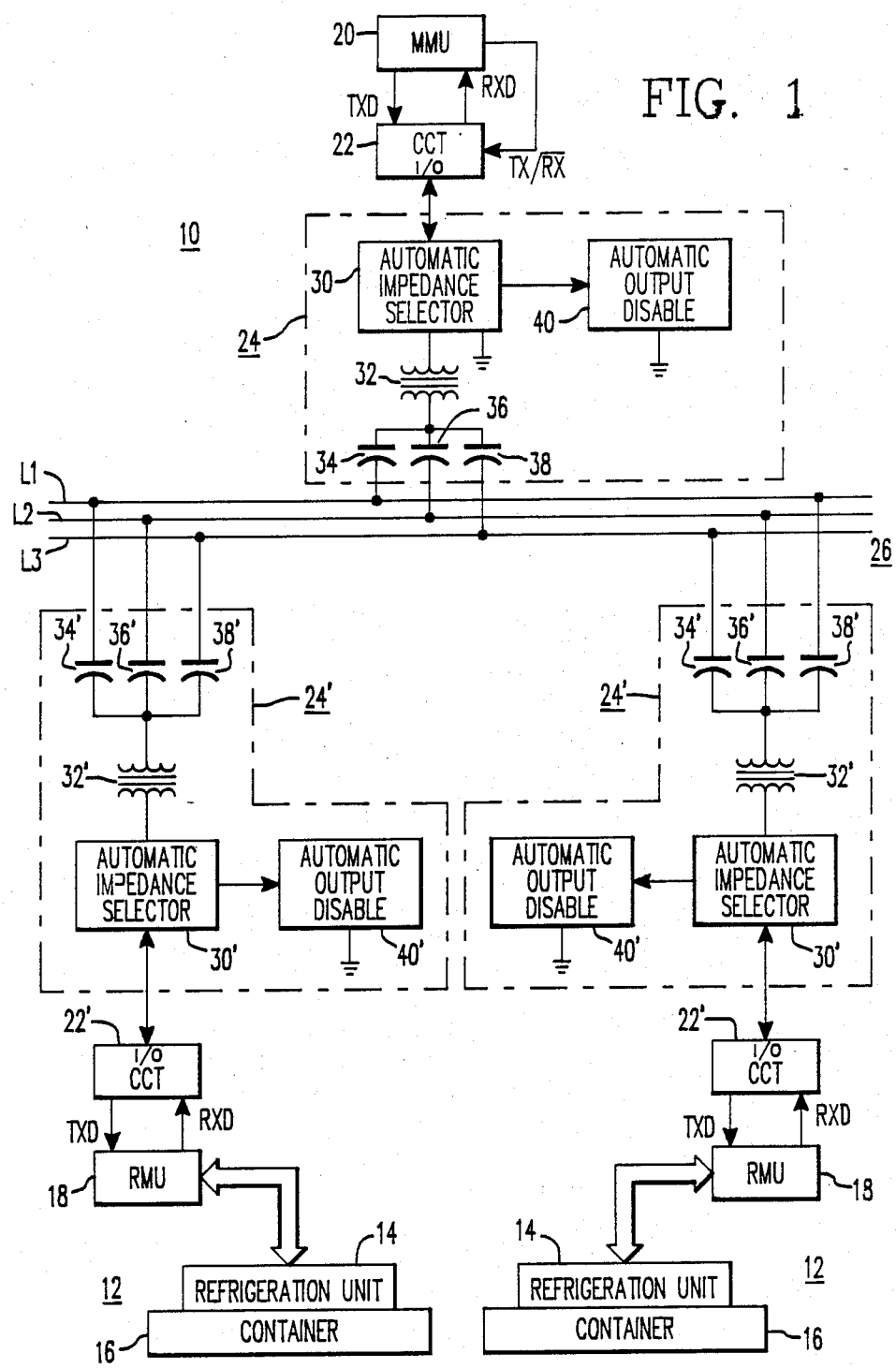
FIG. 1 is a block diagram of a power line carrier communication system constructed according to the teachings of the invention.

Referring now to the drawings, and to FIG. 1 in particular, there is shown a block diagram of a power line carrier communication system 10 constructed according to the teachings of the invention. System 10 includes a plurality of transportable refrigerated containers or reefers 12, with each reefer 12 including a refrigeration unit 14 which conditions the air in a container 16. U.S. Pat. Nos. 4,402,191; 4,409,797; and 4,424,684, which are assigned to the same assignee as the present application, illustrate typical container refrigeration units.

Each reefer 12 includes a remote monitoring unit (RMU) 18, described in detail in the incorporated application, which includes means for receiving or obtaining status information relative to the operation of the associated refrigeration unit 14 and various parameters associated with the conditioned space of container 16, such as temperature. RMU 18 may also be operative to transmit device messages to the refrigeration unit 14, which control predetermined functions, such as temperature set point, i.e., the desired temperature of the conditioned air in container 16.

Reefers 12 are monitored by a master monitoring unit (MMU) 20, described in detail in the incorporated application, which includes a central computer for preparing, transmitting and receiving messages. A carrier current transceiver (CCT) 22 and a power line coupling interface 24 are disposed between MMU 22 and an electrical distribution power line 26 which extends to the locations of the plurality of reefers 12. As will be hereinafter explained, coupling interface 24 is constructed according to the teachings of the invention, and CCT 22 may be a commercially available carrier current chip, such as National Semiconductor's LM1893.

Each RMU 18 also includes a CCT 22' and a power line coupling interface 24' which may be similar to the CCT 22 and interface 24 associated with MMU 20, and thus they are given like reference numerals with a prime mark.

MMU 20 prepares a message for a specific RMU 18 using an unique address assigned to each reefer 12, or when mapping newly added reefers 12 into the monitoring network, MMU 20 may use a universal address. Each message is transmitted to the RMUs 18 via CCT 22 which applies the message to power line 26 via coupling interface 24. All of the RMUs 18 monitor the power line 26 via their coupling interfaces 24', and when specifically addressed, the addressed RMU 18 will prepare a response message and apply it to power line 26 via its coupling interface 24'. When universally addressed for mapping purposes, the RMUs 18 respond in a predetermined manner with their unique addresses, such as by using the mapping strategy disclosed in concurrently filed application Ser. No. 189,896 entitled "Method Of Mapping Refrigerated Containers In A Power Line Carrier Based Monitoring System", which is assigned to the same assignee as the present application. MMU 20 receives the messages from the RMUs 18 via its coupling interface 24. A message to be transmitted over a power line will hereinafter be referred to as TX Signals, and a message received from a power line will be called RX Signals.

It is desirable for reliable power line communication at the MMU 20 and at each RMU 18 that the receiving impedance for RX Signals be high, and that the output drive impedance for TX Signals be low. It is also desirable that power line communications not be tied up by a malfunction which results in continuous, or unduly long transmissions of TX Signals. The new and improved power line coupling interface 24 includes automatic impedance selector means 30, a coupling transformer 32, and coupling capacitors 34, 36 and 38 connected between coupling transformer 32 and lines L1, L2 and L3 of power line 26. Coupling interface 24 further includes automatic output disable means 40 for preventing TX Signals from being applied to power line 26 if a transmission of TX Signals persists beyond a predetermined period of time. The coupling interfaces 24' associated with the RMUs are of like construction, and thus only coupling interface 24 will be described.

Figure 2:
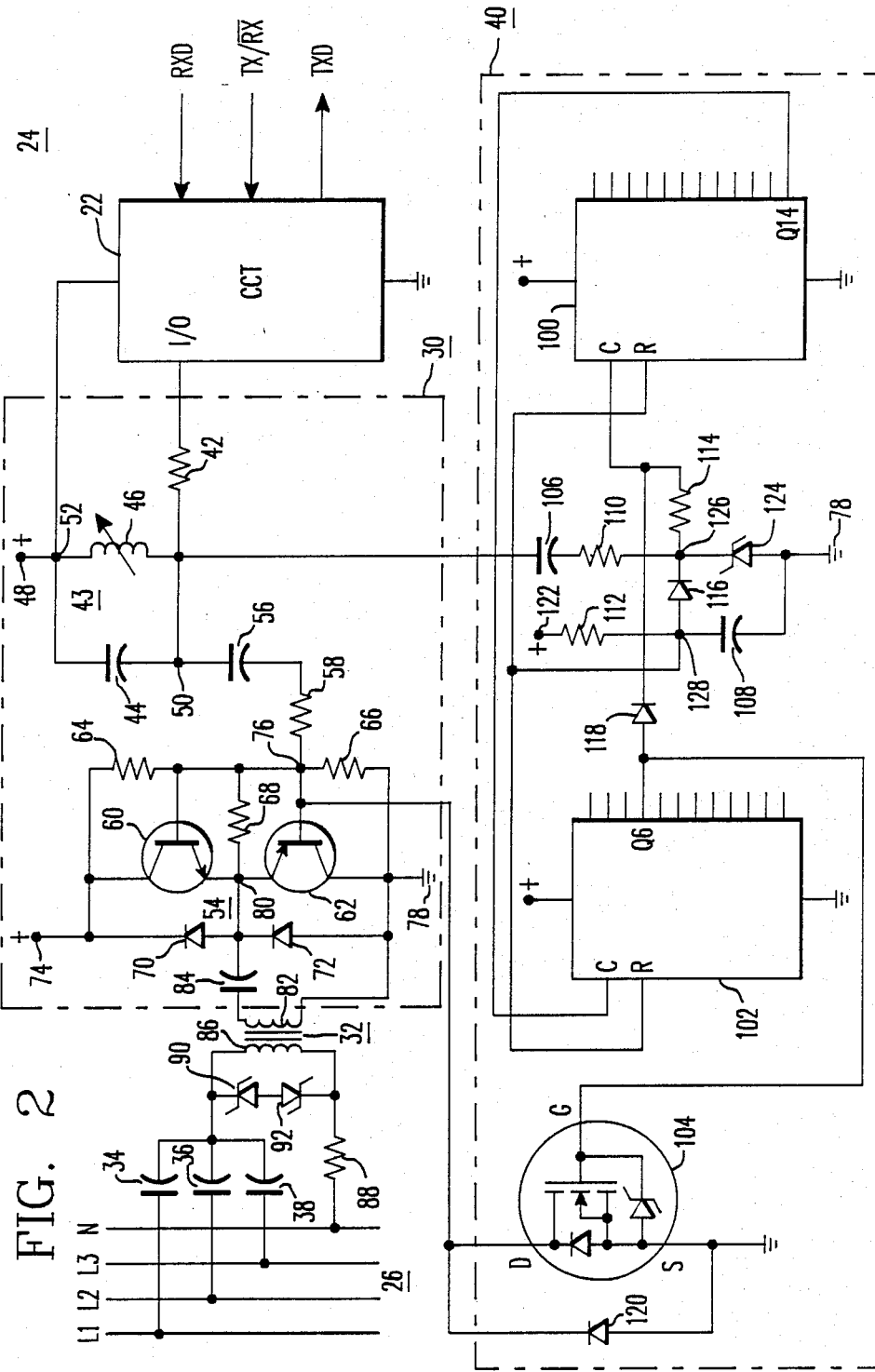
FIG. 2 is a schematic diagram illustrating in detail certain of the functions shown in block form in FIG. 1.

FIG. 2 is a detailed schematic diagram of coupling interface 24, including the automatic impedance selector function 30 and the automatic output disable function 40, constructed according to the teachings of the invention.

More specifically, automatic impedance selector function 30 includes a resistor 42 connected to the I/O output port of CCT 22. Resistor 42 has a relatively low value, such as about 10 ohms. A parallel circuit 43 comprising a capacitor 44 and an adjustable inductor 46 has a first end 50 connected to resistor 42 and a second end 52 connected to a source 48 of unidirectional potential. Parallel circuit 43 is tuned to parallel resonance at the carrier frequency, which may be 55 KHz, for example. Exemplary values for capacitor 44 and inductor 46 are 0.01 microfarad and 800 microhenrys, respectively. End 50 of parallel circuit 43 is connected to the input of a solid state current amplifying function 54 via a serially connected capacitor 56 and a resistor 58. Exemplary values for capacitor 56 and resistor 58 are 0.1 microfarad and about 500 ohms, respectively.

Solid state amplifying function 54 includes bipolar NPN and PNP transistors 60 and 62, respectively, resistors 64, 66 and 68, and a source 74 of unidirectional potential. Diodes 70 and 72 protect the circuitry against transients from the power line 26. The base electrodes of transistors 60 and 62 are connected in common and to resistor 58 at junction 76. Resistors 64 and 66, which have relatively large values, such as 10K ohms, are serially connected from source 74 to ground 78, with their junction being in common with junction 76. The emitter electrodes of transistors 60 and 62 are connected in common at junction 80, and the collector electrodes of transistors 60 and 62 are respectively connected to source 74 and ground 78. Diode 70 is connected from junction 80 to source 74, with its anode connected to junction 80, and diode 72 is connected from ground 78 to junction 80, with its anode connected to ground 78. Resistor 68, which has an exemplary value of about 500 ohms, is connected between junctions 76 and 80.

The output of current amplifying function 54 is connected to a first winding 82 of coupling transformer 32 via a capacitor 84, with capacitor 84 having an exemplary value of 0.68 microfarad. A second winding 86 of coupling transformer 32 has one end connected to power line 26 via coupling capacitors 34, 36 and 38, and its remaining end connected to the neutral conductor N of power line 26 via a resistor 88 which has a relatively small value, such as about 10 ohms. Zener diodes 90 and 92 may be connected across winding 86 to limit the voltage applied to transformer 32 from the power line side.

In the operation of automatic impedance selector 30, it will first be assumed that CCT 22 is in a receiving mode. The current amplifying function 54 will be off. Thus, the receiving or input impedance presented to the AC carrier signal (RX Signals) by coupling interface 24 is determined primarily by resistors 68, 64, 66, 58 and 42, and the parallel resonant circuit 43. The two 10K parallel connected resistors 64 and 66 provide 5K ohms, which value is in parallel with the impedance of the tuned circuit 43. Actual measurements indicate that the resulting receiving impedance is about 3K ohms, and that this value is relatively flat over a frequency of about 30 KHz to 70 KHz.

When CCT 22 is in a transmitting mode, it provides a carrier signal of about 24 volts peak to peak. This signal, after overcoming the voltage drop across diodes 70 and 72 at voltage zero crossover points, turns on amplifier 54 and provides a current gain for the carrier signal (TX Signals) which is applied to power line 26 via capacitor 84, transformer 32, and coupling capacitors 34, 36 and 38. The current flow path during the positive half cycle of the carrier includes source 74, transistor 60, capacitor 84, winding 82 and ground 78. The current flow path during the negative half cycle of the carrier includes capacitor 84, transistor 62, and winding 82.

The output drive impedance is thus determined by those circuit elements between the output of amplifier 54 and the power line 26, i.e., by capacitor 84, which is about 4 ohms reactive, by coupling transformer 32, which typically has a DC resistance of about 5 ohms, and by the reactance of coupling capacitors 34, 36 and 38, which typically is about 4 ohms. Thus, the output drive impedance is about 5+8j, or about 9 to 10 ohms. Amplifying function 54 thus effectively by-passes the effects of the impedance elements which determine the receiving impedance, providing a very low output drive impedance and a relatively high receiving impedance, e.g., about 10 ohms output impedance compared with about 3K ohms input impedance. Further, the impedance selection is automatic, being activated to the low output drive impedance by CCT 22 when it switches to a transmitting mode, and the impedance selection is accomplished with solid state switching devices. Relays or other electromechanical devices which would sacrifice reliability and increase maintenance costs are not required.

The automatic output disable function 40 includes first and second counters 100 and 102, such as RCA's 14 stage CD4020, a solid state switching device 104, such as a N-channel IGFET, capacitors 106 and 108, resistors 110, 112 and 114, diodes 116, 118 and 120, a source 122 of unidirectional potential having a value of 5 volts, and a Zener diode 124.

Capacitor 106, which may have a value of about 0.0012 microfarad, resistor 110, which may have a value of about 1K ohms, and Zener diode 124, which may have a breakdown rating of about 5.5 volts, are serially connected from junction 50 to ground 78. The junction 126 between resistor 110 and Zener diode 124 is connected to the clock input C of counter 100 via resistor 114, which may have a value of about 20K ohms. The count of counter 100 is advanced by one by each negative going transition applied to input C. The last stage Q14 of counter 100 is connected to the clock input C of counter 102. Thus, when counter 100 overflows, the count of counter 102 will be advanced by one.

A selected output stage of counter 102, depending upon the predetermined period of time to be monitored, such as output Q6, is connected to the gate electrode G of solid state switch 104. Stage Q6 is also connected to the clock input C of counter 100 via diode 118.

A reset function is provided by connecting voltage source 122 (V+) to serially connected resistor 112 and capacitor 108, with capacitor 108 being connected to ground 78. Junction 128 between resistor 112 and capacitor 108 is connected to the reset inputs R of counters 100 and 102. When junction 128 goes high, i.e., to +5 volts, the output stages of counters 100 and 102 will be reset to zero. Junction 128 is also connected to junction 126 via diode 116.

The input to amplifier 54 of the impedance selection function 30 is connected to ground via the drain and source electrodes D and S, respectively, of switch 104. Diode 120 is connected between the drain and source electrodes D and S.

When CCT is in a receiving mode, the voltage at junction 50 will be insufficient to break down Zener 124, and thus counter 100 will be inactive. Source 112 will charge capacitor 108 to +5 volts through resistor 112, and thus both counters 100 and 102 will be in their reset states. The RC time constant of resistor 112 and capacitor 108 is relatively long, such as 440 microseconds, provided, for example, by a resistance value of 200K ohms and a capacitance value of 0.0022 microfarad.

When CCT 22 changes to a transmit mode, the 24 volt peak to peak carrier signal will charge capacitor 106 and breakdown Zener 124 on positive half cycles, and capacitor 108 will discharge through diode 116 towards capacitor 106 on negative half cycles. Since the period of the carrier frequency is short compared with the RC charging constant of capacitor 108, e.g., 18 microseconds for a carrier frequency of 55 KHz, capacitor 108 will be held near ground while CCT 22 is transmitting, and the counters 100 and 102 will be allowed to count the length of the CCT transmission. Junction 126 will go up and down in voltage with the 24 volt peak to peak carrier transmissions of CCT 22, providing the negative going transitions which clock counter 100.

If a normal maximum message length is 4 seconds, for example, function 40 may be set to automatically disable the output of impedance selector 30 if the transmission persists for about 8 to 10 seconds. When the desired maximum time of 8 to 10 seconds if reached, Q6 will go high, turning switch 104 on and connecting junction 76 to ground. Thus, CCT may continue to transmit without tying up power line communications. When Q6 goes high, the counting of counter 100 is stopped via diode 118, to prevent Q6 from being driven low through subsequent counting action of counter 100. Even though counter 100 is disabled, a continued transmission by CCT 22 will keep the voltage on capacitor 108 near ground, to prevent the resetting of counters 100 and 102.

Should a transmission by CCT 22 which activated the crowbar effect of circuit 40 cease, capacitor 108 will be allowed to charge from source 122 via resistor 112, resetting counters 100 and 102 after a predetermined period of time determined by the RC time constant. This will turn switch 104 off, once again enabling transmissions from CCT 22 to be applied to power line 26.

We claim as our invention:

1. A power line carrier communication system for sending and receiving communication signals over an electrical power line, comprising:
    a carrier current transceiver (CCT),
    a bi-directional coupling interface disposed between said CCT and the electrical power line,
    said CCT having an input/output (I/O) port for receiving serial signals (RX Signals) from the electrical power line, and for applying serial signals (TX Signals) to the electrical power line, via said coupling interface,
    said coupling interface including impedance means connected to provide a predetermined high receiving impedance, and solid state switching means automatically operative in response to TX Signals to effectively bypass the impedance means which provides the high receiving impedance and provide a predetermined low output drive impedance.

2. The power line carrier communication system of claim 1 wherein the impedance means includes a parallel resonant LC circuit tuned to the frequency of the power line carrier signals.

3. The power line carrier communication system of claim 1 wherein the solid state switching means is connected as a current amplifier having an input driven by the I/O port of the CCT, and an output which is connected to the electrical power line via a capacitor, a coupling transformer, and coupling capacitors.

4. A power line carrier communication system for sending and receiving communication signals over an electrical power line, comprising:

a carrier current transceiver (CCT), a coupling interface disposed between said CCT and the electrical power line, said CCT having an input/output (I/O) port for receiving serial signals (RX Signals) from the electrical power line, and for applying serial signals (TX Signals) to the electrical power line, via said coupling interface, said coupling interface including impedance means connected to provide a predetermined high receiving impedance, and solid state switching means automatically operative in response to TX Signals to effectively bypass the impedance means which provides the high receiving impedance and provides a predetermined low output drive impedance, timing means having a predetermined timing period for timing the length of a TX Signal transmission, and disable means for preventing the TX Signals from being applied to the electrical power line if the TX Signals persist for said predetermined timing period.

5. The power line carrier communication system of claim 4 including reset means for resetting said timing means and said disable means a predetermined period of time after termination of a TX Signal transmission which actuated the disable means.

6. The power line carrier communication system of claim 4 wherein the timing means includes first and second counters, with said first counter being responsive to the carrier frequency and with said second counter counting the number of overflows of said first counter, with said second counter providing an output signal after a TX Signal transmission has persisted for the predetermined timing period, with the output signal of said second counter stopping said first counter and actuating the disable means.

7. The power line carrier communication system of claim 6 including reset means for resetting the first and second counters and the disable means a predetermined period of time after termination of a TX signal which actuated the disable means.

8. The power line carrier communication system of claim 4 wherein the disable means is a solid state when the TX signals persist for the predetermined timing period.

* * * * *